(12) United States Patent
Yamaura

(10) Patent No.: US 6,627,351 B1
(45) Date of Patent: Sep. 30, 2003

(54) NON-AQUEOUS ELECTROLYTE BATTERY

(75) Inventor: Kiyoshi Yamaura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/586,895

(22) Filed: Jun. 5, 2000

(30) Foreign Application Priority Data

Jun. 4, 1999 (JP) .......................................... P11-158355

(51) Int. Cl.$^7$ ................................................ H01M 4/50

(52) U.S. Cl. ................ 429/224; 429/231.1; 429/231.95; 429/322; 429/323; 429/330; 429/338; 429/337; 429/339; 429/340; 429/342

(58) Field of Search .............................. 429/224, 231.1, 429/231.95, 322, 323, 330, 338, 337, 339, 340, 342

(56) References Cited

U.S. PATENT DOCUMENTS 6,030,726 A * 2/2000 Takeuchi et al. ......... 429/231.8

* cited by examiner

Primary Examiner—Laura Weiner
(74) Attorney, Agent, or Firm—Sonnenschein, Nath & Rosenthal LLP

(57) ABSTRACT

A non-aqueous electrolyte battery free from considerable change in the structure of a positive electrode active material thereof to enlarge the capacity thereof, incorporating a positive electrode containing a positive-electrode active material; a negative electrode containing a negative-electrode active material to which Li can be doped/dedoped; and a non-aqueous electrolyte disposed between the positive electrode and the negative electrode and containing non-aqueous solvent and an electrolyte, wherein a material expressed by general formula $LiMn_{1-y}Al_yO_2$ ($0.06 \leq y < 0.25$) is contained as the positive-electrode active material and $LiMn_{1-y}Al_yO_2$ has a crystalline structure expressed by spatial group C2/m.

3 Claims, 4 Drawing Sheets

NON-AQUEOUS ELECTROLYTE BATTERY

BACKGROUND OF THE INVENTION

1. Field of the Invention

The present invention relates to a non-aqueous electrolyte battery incorporating a positive-electrode active material constituted by a composite lithium oxide.

2. Description of the Related Art

In recent years, considerable progress of a variety of electronic apparatuses has been made. Therefore, rechargeable secondary batteries have been studied which can conveniently be used for a long time with low cost. Representative secondary batteries are exemplified by a lead battery, an alkali battery and a lithium secondary battery. In particular, the lithium secondary battery has advantages of high output and a high energy density. The lithium secondary battery incorporates positive and negative electrodes, to which lithium ions can reversibly be doped/dedoped, and non-aqueous electrolytic solution.

The capacities of the lithium secondary batteries have been enlarged recently. On the other hand, reduction in the cost has been attempted by selecting materials. In particular, a cobalt oxide which has been employed to constitute the positive electrode is a costly material as compared with other oxides of nickel, manganese and iron. Therefore, alternative employment of a relatively low-cost metal oxide has been required. In particular, employment of a manganese oxide which is one of transition metal materials exhibiting lowest cost to constitute the positive electrode has been required. As a representative manganese oxide, a spine compound $LiMn_2O_4$ is known. The theoretical capacity of the foregoing compound is smaller than 150 mAh/g which is smaller than 274 mAh/g of $LiCoO_2$. The reason for this lies in that $LiMn_2O_4$ contains Li atoms, the number of which is half of Li atoms in $LiCoO_2$ which include Li atoms by the same number as those in transition metal.

Therefore, $LiMnO_2$ having a theoretical capacity equivalent to that of $LiCoO_2$ has energetically been studied as a candidate of the positive-electrode active material containing manganese. According to reports of studies in the early stage, high-temperature $LiMnO_2$ and low-temperature $LiMnO_2$ have been reported.

High-temperature $LiMnO_2$ has first been reported by W. D. Johnston et al. (J. Am. Chem. Soc., 78, 325 (1956)). Then, R. Hoppe, G. Brachtel and M. Jansen (Z. Anorg. Allg. Chmie, 417, 1 (1975) have determined the structure. Low-temperature $LiMnO_2$ has first been reported by T. Ozuka, A. Ueda and T. Hirai (Chem. Express, Vol. 7, No. 3, 193 (1992)).

Each of high-temperature $LiMnO_2$ and low-temperature $LiMnO_2$ has a structure incorporating orthorombic lattices and defined by space group Pmnm. The theoretical capacity of each of the high-temperature LiMnO, and low-temperature $LiMnO_2$ is about 300 mAh/g. The theoretical capacity cannot be realized when the charge/discharge conditions which are adapted to the present non-aqueous electrolyte batteries are employed.

According to the foregoing documents, the charge capacity of high-temperature $LiMnO_2$ is 150 mAh/g and that of the low-temperature $LiMnO_2$ is 200 mAh/g. The initial discharge capacity of high-temperature $LiMnO_2$ is not higher than 50 mAh/g (2.0 V$\geq$V (Li/Li$^+$), while that of low-temperature LiMnO, is 190 mAh/g (2.0 V$\geq$V (Li/Li$^+$)).

The foregoing values are those measured when the current density is 100 $\mu$A/cm$^2$ or lower. To practically employ the foregoing manganese oxides, the foregoing values must be realized when the current density is 500 $\mu$A/cm$^2$ or higher. When the foregoing manganese oxide is used at the high-load current density, the discharge capacities of the high-temperature $LiMnO_2$ and the low-temperature $LiMnO_2$ are reduced to about 40 mAh/g and about 120 mAh/g, respectively.

The foregoing phenomenon are caused from the following two factors. That is, each material has a crystalline structure as shown in FIG. 1 that sheets each of which is constituted by Mn—O are laminated such that Li is introduced between the Mn—O sheets. The foregoing crystalline structure, however, has the diffusion paths for Li formed into a zigzag shape. Thus, quick diffusion of Li cannot be observed. Another reason lies in that the high-temperature $LiMnO_2$ has high crsytallinity. Therefore, the electron resistance caused from impurity failure is low. On the other hand, low-temperature $LiMnO_2$ having low crystallinity encounters high resistance caused from impurity. Therefore, low-temperature $LiMnO_2$ encounters considerable IR drop owing to a high load, that is, a high current density. Therefore, great energy loss occurs. Under the foregoing circumstances, $LiMnO_2$ having a flat layer structure permitting quick diffusion of Li and exhibiting high crystallinity has been required.

In 1996, Armstrong et al. has prepared $LiMnO_2$, having space symmetry of C2/m by ion-substituting Na of $NaMnO_2$ (A. R. Armstrong et aluminum., Nature, 381,499 (1996)). Thus, a first report about $LiMnO_2$ having the flat structure has been made. Then, in 1998, a report has been made that the same structure as that of $LiMnO_2$ reported by Armstrong et al. can be obtained by performing preparation of $LiMn_{0.75}.,Al_{0.25}O_2$ such that partial pressure of oxygen is controlled (Y. Jang et aluminum., Electrochemical and Solid-State Letters, 1, (1) 13 (1998)). The reported compound, which has been prepared at high temperatures, has high crystallinity. Moreover, enlargement of the capacity under a high load has been expected owing to the flat diffusion paths for Li.

Each $LiMnO_2$ encounters change in the structure (formed into a spinel structure) during the charging process, causing the discharge capacity to be reduced. In particular, $LiMnO_2$ of the type reported by Armstrong et al. encounters considerable change in the structure during the charging process. Thus, a satisfactorily large discharge capacity cannot be obtained.

On the other hand, a consideration is made that $LiMn_{0.75}Al_{0.25}O_2$ is not thermodynamically unstable as compared with $LiMnO_2$. As compared with $LiMnO_2$, change in the structure does not considerably occur. However, formation of a solid solution of Al which is electrochemically inactive results in reduction in the capacity.

SUMMARY OF THE INVENTION

In view of the foregoing, an object of the present invention to provide a non-aqueous electrolyte battery free from considerable change in the structure of a positive-electrode active material thereof and capable of enlarging the capacity thereof.

To achieve the object, according to one aspect of the present invention, there is provided a non-aqueous electrolyte battery comprising: a positive electrode containing a positive-electrode active material; a negative electrode containing a negative-electrode active material to which Li can be doped/dedoped; and a non-aqueous electrolyte disposed between the positive electrode and the negative electrode and containing non-aqueous solvent and an electrolyte, wherein a material expressed by general formula $LiMn_{1-y}Al_yO_2$, ($0.06 \leq y < 0.25$) is contained as the positive-electrode active material and $LiMn_{1-y}A_{1-y}O_2$ has a crystalline structure expressed by space group C2/m.

The non-aqueous electrolyte battery according to the present invention and incorporating a layered compound expressed by $LiMn_{1-y}Al_yO_2$ is able to enhance diffusion of lithium ions. Since the non-aqueous electrolyte battery according to the present invention is structured such that the value of y of $LiMn_{1-y}Al_yO_2$ is specified, deterioration in the electric conductivity can be prevented. Moreover, thermal stability of the crystalline structure can be improved.

Other objects, features and advantages of the invention will be evident from the following detailed description of the preferred embodiments described in conjunction with the attached drawings.

DETAILED DESCRIPTION OF THE PREFERRED EMBODIMENTS

Embodiments of the present invention will now be described.

Figure 1:
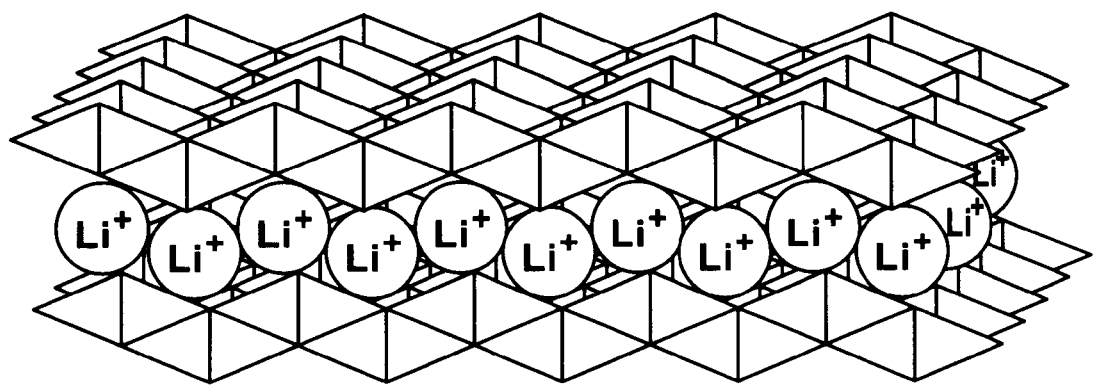
FIG. 1 is a diagram showing the crystalline structure of orthorombic $LiMnO_2$ for use as a positive-electrode active material of a conventional battery.
Figure 2:
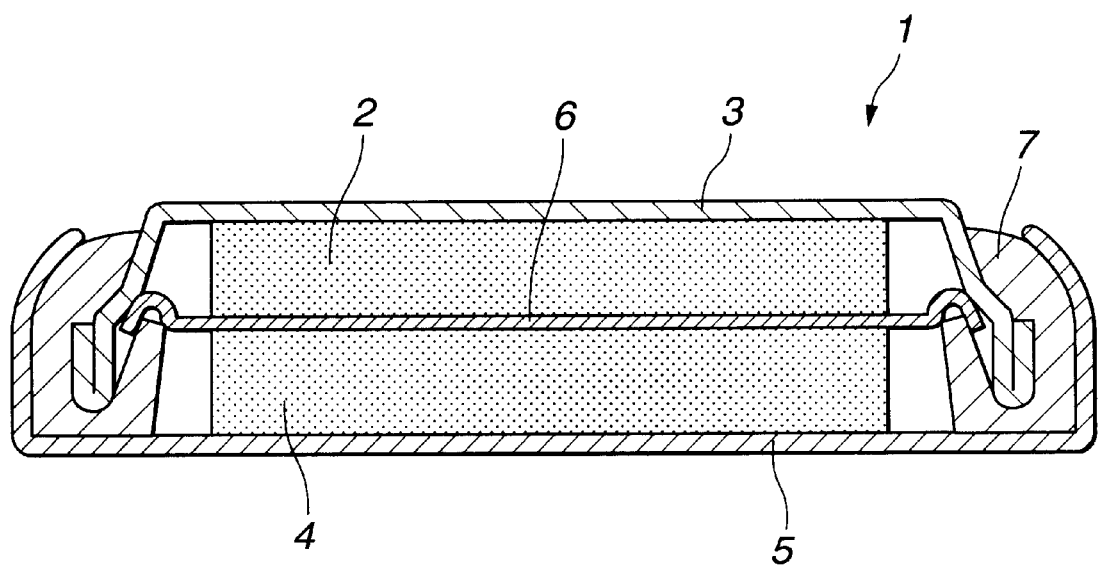
FIG. 2 is a cross sectional view showing an example of the structure of a non-aqueous electrolyte battery according to the present invention.

An example of a non-aqueous electrolyte battery according to the embodiment is shown in FIG. 2. The nion-aqueous electrolyte battery 1 according to this embodiment incorporates a negative electrode 2, a negative electrode can 3 for accommodating the negative electrode 2, a positive electrode 4, a positive electrode can 5 for accommodating the positive electrode 4, a separator 6 disposed between the positive electrode 4 and the negative electrode 2 and an insulating gasket 7. Non-aqueous electrolytic solution is enclosed in the negative electrode can 3 and the positive electrode can 5.

The negative electrode 2 is constituted by, for example, metal lithium foil, serving as a negative-electrode active material. When the negative-electrode active material is a material to which lithium can be doped/dedoped, a negative-electrode active material layer containing the negative-electrode active material is formed on a negative-electrode collector of the negative electrode 2. The negative-electrode collector is constituted by, for example, nickel foil. When a lithium ion battery is constituted, lithium metal foil may be used as the negative electrode 2.

As the negative-electrode active material to which lithium can be doped/dedoped, lithium, a lithium alloy or a conductive polymer or a layered compound (a carbon material or a metal oxide) containing lithium doped thereto is employed.

The negative-electrode active material layer contains a binder which may be a known resin material which is usually used as a binder for a negative-electrode active material layer of a non-aqueous electrolyte battery of the foregoing type.

The negative electrode can 3 accommodates the negative electrode 2 and serves as an external negative electrode of the non-aqueous electrolyte battery 1.

The positive electrode 4 has a structure that a positive-electrode active material layer containing a positive-electrode active material and a binder is formed on a positive electrode collector. The positive-electrode collector is constituted by, for example, aluminum foil.

The non-aqueous electrolyte battery according to this embodiment incorporates the positive-electrode active material constituted by a compound expressed by general formula $LiMn_{1-y}Al_yO_2$. The compound $LiMn_{1-y}Al_yO_2$ has a crystalline structure expressed by a space group C2/m. Al is substituted for a portion of Mn of $LiMnO_2$, to form solid solution of Al so that $LiMn_{1-y}Al_yO_2$ is obtained. Thus, the thermal stability of the crystalline structure during the charging step can be improved. Since the thermal stability of the crystalline structure during the charging step can be improved, spinel transition during the charging step can be prevented. Thus, an effect can be obtained in that the discharge capacity can been enlarged.

The value of y in $LiMn_{1-y}Al_yO_2$ satisfies a range $0.06 \leq y < 0.25$. When $y < 0.06$, a satisfactory effect for improving the thermal stability of the crystalline structure of the compound cannot be obtained. When $y \geq 0.25$, a ratio of Al which is electrochemically inactive is raised. Thus, the electronic conductivity deteriorates, causing the polarization of $LiMn_{1-y}Al_yO_2$ to be enhanced. As a result, the capacity is reduced. Since the ratio of Al is raised, the quantity of Mn or Mn—O bonds is undesirably reduced. Therefore, the value of y is made to satisfy $0.06 \leq y < 0.25$ so that the thermal stability of the crystalline structure is improved and the discharge capacity is enlarged without any deterioration in the electric conductivity.

Figure 3:
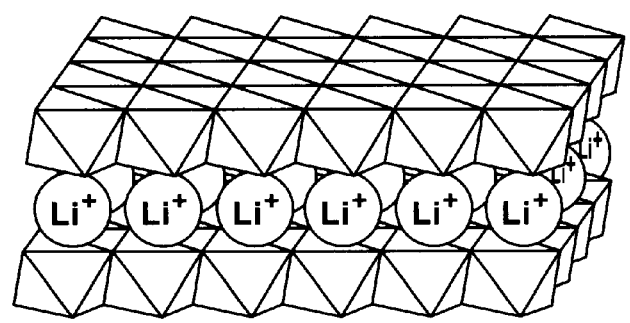
FIG. 3 is a diagram showing the crystalline structure of $LiMn_{1-y}Al_yO_2$ for use as positive-electrode active material of the battery according to the present invention and expressed by space group C2/m.

As described above, $LiMn_{1-y}Al_yO_2$ has the crystalline structure expressed by space group C2/m. The crystalline structure expressed by the space group C2/m has a shape as shown in FIG. 3 that flat sheet layers constituted by Mn—O are laminated and Li is introduced between the Mn—O sheet layers. The foregoing laminate structure causes diffusion paths for lithium ions to be two-dimensional shape. As a result, lithium ions can efficiently and quickly be dispersed.

In Japanese Patent Publication No. 2870741, a lithium ion secondary battery incorporating the positive-electrode active material constituted by granular composition expressed by $LiMn_{1-x}A_xO_y$ has been disclosed. In the foregoing disclosure, a description is made that $LiMn_{1-x}A_xO_y$ has a similar rhombic structure to that of $LiMnO_2$.

Specifically, the inventors has prepared $LiMn_{0.951}Al_{0.05}O_2$ in Example 9. Moreover, description has been made that "the X-ray diffraction pattern of obtained powder was examined, thus resulting in that a pattern similar to that of composite oxide of lithium and manganese (zigzag shape $LiMnO_2$ reported before 1995) was confirmed.

On the other hand, the inventor of the present invention has detected a fact that $LiMn_{1-y}Al_yO_2$ has the layered structure expressed by the space group C2/m. Moreover, the diffusion paths for lithium ions are formed into two-dimension shape. Thus, lithium ions can quickly be dispersed.

The effect of the present invention is caused from a fact that the crystalline structure of $LiMn_{1-y}Al_yO_2$, has a flat layered shape and the diffusion paths for lithium ions are formed into two-dimensional shape. The fact that $LiMn_{1-y}Al_yO_2$ has the flat layered structure expressed by the space group C2/m is confirmed owing to the X-ray diffraction pattern of the foregoing compound measured by the inventor of the present invention as described in examples to be described later.

The inventor of the above-mentioned disclosure has not recognized the fact that the $LiMn_{0.95}Al_{0.05}O_2$ has the layered structure. As described above, the effect of the present invention is caused from a fact that the crystalline structure of $LiMn_{1-y}Al_yO_2$ has a flat layered shape. Therefore, the foregoing fact according to the present invention is not included in the previous invention.

The binder to be contained in the positive electrode mix may be a known binder which is usually employed in the positive electrode mix of a battery of the foregoing type. Moreover, a known additive may be added to the positive electrode mix.

The positive electrode can 5 accommodates the positive electrode 4 and serves as the external positive electrode of the non-aqueous electrolyte battery 1.

The separator 6 insulates the positive electrode 4 and the negative electrode 2 from each other. The separator 6 may be made of a known material which is usually employed as the material of the separator of the non-aqueous electrolyte battery of the foregoing type. For example, a polymer film of, for example, polypropylene is employed.

The insulating gasket 7 is included in the negative electrode can 3 so as to be integrated with the negative electrode can 3. The insulating gasket 7 prevents leakage of non-aqueous electrolytic solution enclosed in the negative electrode can 3 and the positive electrode can 5.

The non-aqueous electrolytic solution is prepared by dissolving the electrolyte in non-aqueous solvent.

The electrolyte may be a known electrolyte which is usually employed in a battery of the foregoing type. Specifically, the material of the electrolyte is exemplified by lithium salt, such as $LiClO_4$, $LiAsF_6$, $LiPF_6$, $LiBF_4$, $LiB(C_6H_5)_4$, $CH_3SO_3Li$, $CF_3SO_3Li$, $LiCl$ or $LiBr$.

The non-aqueous solvent may be a variety of non-aqueous solvent which has been employed in the non-aqueous electrolytic solution. Specifically, any one of the following materials may be employed: polypropylene carbonate, ethylene carbonate, dimethyl carbonate, diethyl carbonate, 1,2-dimethoxyethane, 1,2-diethoxyethane, γ-butylolactone, tetrahydrofuran, 2-methyltetrahydrofuran, 1,3-dioxolane, 4-methyl-1,3-dioxolane, diethylether, sulfolane, methylsulfolane, acetonitrile, propionitrile, anisole, acetic ester, butyric ester and propionate. The foregoing non-aqueous solvent material may be employed solely or a plurality of the materials may be mixed.

The non-aqueous electrolyte battery 1 having the above-mentioned structure that the diffusion paths for lithium ions are formed into two-dimensional shape. Thus, diffusion of lithium ions can be enhanced and the capacity of the battery can be enlarged. Since Al is formed into solid solution, the stability of the crystalline structure of the positive-electrode active material can be improved. As a result, durability against cycle operations can significantly be improved.

The foregoing non-aqueous electrolyte battery 1 is manufactured as follows.

The negative electrode 2 is manufactured as follows: the negative-electrode active material and the binder are dispersed in the solvent to prepare the negative electrode mix in the form of slurry. Then, the obtained negative electrode mix is uniformly applied to the surface of the collector, and then the collector is dried Thus, the negative-electrode active material layer is formed so that the negative electrode is manufactured. The binder to be contained in the negative electrode mix may be a known binder. Note that a known additive may be added to the negative electrode mix. When a lithium ion battery is manufactured, lithium foil may be employed as the negative electrode 2.

The positive electrode 4 is manufactured as follows: the positive electrode mix containing the positive-electrode active material and the binder is uniformly applied to the surface of metal foil which is formed into the collector. Then, the metal foil is dried so that the positive-electrode active material layer is formed. Thus, the positive electrode 4 is manufactured. The binder for use in the positive electrode mix may be a known binder. Note that a known additive may be added to the positive electrode mix.

The non-aqueous electrolytic solution is prepared by dissolving electrolyte salt in non-aqueous solvent.

Then, the negative electrode 2 is accommodated in the negative electrode can 3 and the positive electrode 4 is accommodated in the positive electrode can 5. Then, the separator 6 constituted by a porous film made of polypropylene is disposed between the negative electrode 2 and the positive electrode 4. The non-aqueous electrolytic solution is introduced into the negative electrode can 3 and the positive electrode can 5. Then, the negative electrode can 3 and the positive electrode can 5 are crimped through the insulating gasket 7 so as to be secured. Thus, the non-aqueous electrolyte battery 1 is manufactured.

In the foregoing embodiment, the non-aqueous electrolyte battery 1 incorporates the non-aqueous electrolytic solution prepared by dissolving the electrolyte in the non-aqueous solvent. The present invention may be applied to a battery of a type incorporating a solid electrolyte in which an electrolyte is dispersed in a matrix polymer and a battery incorporating a gel-type solid electrolyte containing swelling solvent. The battery according to the present invention may be applied to both of a primary battery and a secondary battery.

The battery according to the present invention may be formed into a variety of shapes including a cylindrical shape, a rectangular shape, a coil shape, a button shape and so forth. The shape is not limited. Also the size of the battery may be varied, for example, a thin type shape and a large size shape.

EXAMPLES

To examine the effects of the invention, the foregoing battery was manufactured to evaluate the characteristics by performing experiments.

Example 1 initially, the positive-electrode active material was prepared.

Initially, γ-$MnO_2$ serving as the manganese raw material, $Li_2CO_3$ serving as the lithium raw material and $Al(OH)_3$ serving as the aluminum raw material were weighed in such a manner that molar ratios Li:Mn:Al=1.00:0.94:0.06 were satisfied. Then, an agate mortar was used to sufficiently mix the foregoing raw materials such that mixing of impurities was prevented. Thus, powder of a mixture was obtained.

Then, obtained powder of the mixture was compressed so as to be molded into disc-shape pellet having a diameter of 15 mm and a thickness of 5 mm. The pellet was heated in the air to 1000° C. at a temperature rising rate of 10° C./minute, and then the temperature was maintained. The temperature was maintained for 12 hours in order to cause lithium, manganese and aluminum to completely react with one another to form a single phase structure.

Then, the baked pellet was quickly cooled in the air so that the positive-electrode active material in the form of powder was obtained.

Then, the thus-obtained compound was employed as the positive-electrode active material. Thus, the battery was manufactured.

Initially, 80 wt % of the positive-electrode active material, 15 wt % of graphite serving as a conductive material and 5 wt % of polyvinylidene fluoride were uniformly mixed with one another. Thus, the positive electrode mix was prepared. The obtained graphite had a mean particle size of 5 $\mu$m to 20 $\mu$m. In the foregoing step, KS-15 manufactured by Rontha was employed. The polyvinylidene fluoride was #1300 manufactured by Ardrich.

Then, the positive electrode mix was applied to an aluminum mesh serving as the collector, and then compression was performed. Then, the aluminum mesh was dried at 100° C. for one hour in an argon atmosphere so that the positive-electrode active material layer was formed. Then, the aluminum mesh having the positive-electrode active material layer formed thereon was punched to obtain a disc-shape member having a diameter of 15.5 mm. Thus, a pellet positive electrode was obtained. Note that one positive electrode contained 60 mg active material.

The lithium foil was punched to have a shape which was substantially the same as that of the positive electrode so that the negative electrode was manufactured.

The non-aqueous electrolytic solution was prepared at a concentration of 1 mol/l by dissolving $LiPF_6$ in mixed solvent in which the quantity of polypropylene carbonate and that of dimethyl carbonate were the same.

The thus-obtained positive electrode was accommodated in the positive electrode can, while the negative electrode was accommodated in the negative electrode can. Then, the separator was disposed between the positive electrode and the negative electrode. Then, the non-aqueous electrolytic solution was introduced into the positive electrode can and the negative electrode can. Then, the positive electrode can and the negative electrode can were crimped so as to be secured to each other. Thus, 2025 coin-shape test cells were manufactured. All of the foregoing steps were performed in a dry atmosphere.

Example 2

A similar process to that according to Example 1 was performed except for an arrangement in this example that $\gamma$-$MnO_2$, $Li_2CO_3$ and $Al(OH)_3$ were used at molar ratios that Li:Mn:Al=1.00:0.92:0.08. Thus, a non-aqueous electrolyte battery was manufactured.

Example 3

A similar process to that according to Example 1 was performed except for an arrangement in this example that $\gamma$-$MnO_2$, $Li_2CO_3$ and $Al(OH)_3$ were used at molar ratios that Li:Mn:Al=1.00:0.90:0.10. Thus, a non-aqueous electrolyte battery was manufactured.

Example 4

A similar process to that according to Example 1 was performed except for an arrangement in this example that $\gamma$-$MnO_2$, $Li_2CO_3$ and $Al(OH)_3$ were used at molar ratios that Li:Mn:Al=1.00:0.85:0.15. Thus, a non-aqueous electrolyte battery was manufactured.

Example 5

A similar process to that according to Example 1 was performed except for an arrangement in this example that $\gamma$-$MnO_2$, $Li_2CO_3$ and $Al(OH)_3$ were used at molar ratios that Li:Mn:Al=1.00:0.80:0.20. Thus, a non-aqueous electrolyte battery was manufactured.

Example 6

A similar process to that according to Example 1 was performed except for an arrangement in this example that $\gamma$-$MnO_2$, $Li_2CO_3$ and $Al(OH)_3$ were used at molar ratios that Li:Mn:Al=1.00:0.77:0.23. Thus, a non-aqueous electrolyte battery was manufactured.

Comparative Example 1

A similar process to that according to Example 1 was performed except for an arrangement in this example that $\gamma$-$MnO_2$, $Li_2CO_3$ and $Al(OH)_3$ were used at molar ratios that Li:Mn:Al=1.00:0.75:0.25. Thus, a non-aqueous electrolyte battery was manufactured.

Comparative Example 2

A similar process to that according to Example 1 was performed except for an arrangement in this example that $\gamma$-$MnO_2$, $Li_2CO_3$ and $Al(OH)_3$ were used at molar ratios that Li:Mn:Al=1.00:1.00:0. Thus, a non-aqueous electrolyte battery was manufactured.

Comparative Example 3

A similar process to that according to Example 1 was performed except for an arrangement in this example that $\gamma$-$MnO_2$, $Li_2CO_3$ and $Al(OH)_3$ were used at molar ratios that Li:Mn:Al=1.00:0.98:0.02. Thus, a non-aqueous electrolyte battery was manufactured.

Comparative Example 4

A similar process to that according to Example 1 was performed such that the high-temperature orthorombic $LiMnO_2$ disclosed in Document Z., Anorg. Allg. Chmie, 417, 1 (1975) was employed as the positive-electrode active material. Thus, a non-aqueous electrolyte battery was manufactured.

Comparative Example 5

A similar process to that according to Example 1 was performed such that the low-temperature orthorombic $LiMnO_2$ disclosed in Document Chem. Express, Vol. 7, No. 3,193 (1992) was employed as the positive-electrode active material. Thus, a non-aqueous electrolyte battery was manufactured.

The capacities of the manufactured batteries were evaluated by performing experiments.

The capacity evaluating experiments were performed such that each battery was charged with a constant electric current at a current density of 500 $\mu$A/cell until the voltage of an opened circuit was raised to 4.5±0.5 V (potential with respect to lithium). Then, constant-current discharge was performed at a current density of 500 $\mu$A/cell until the voltage of the closed circuit is lowered to 2.0 V (potential with respect to lithium). Thus, the discharge capacity was measured.

Figure 4:
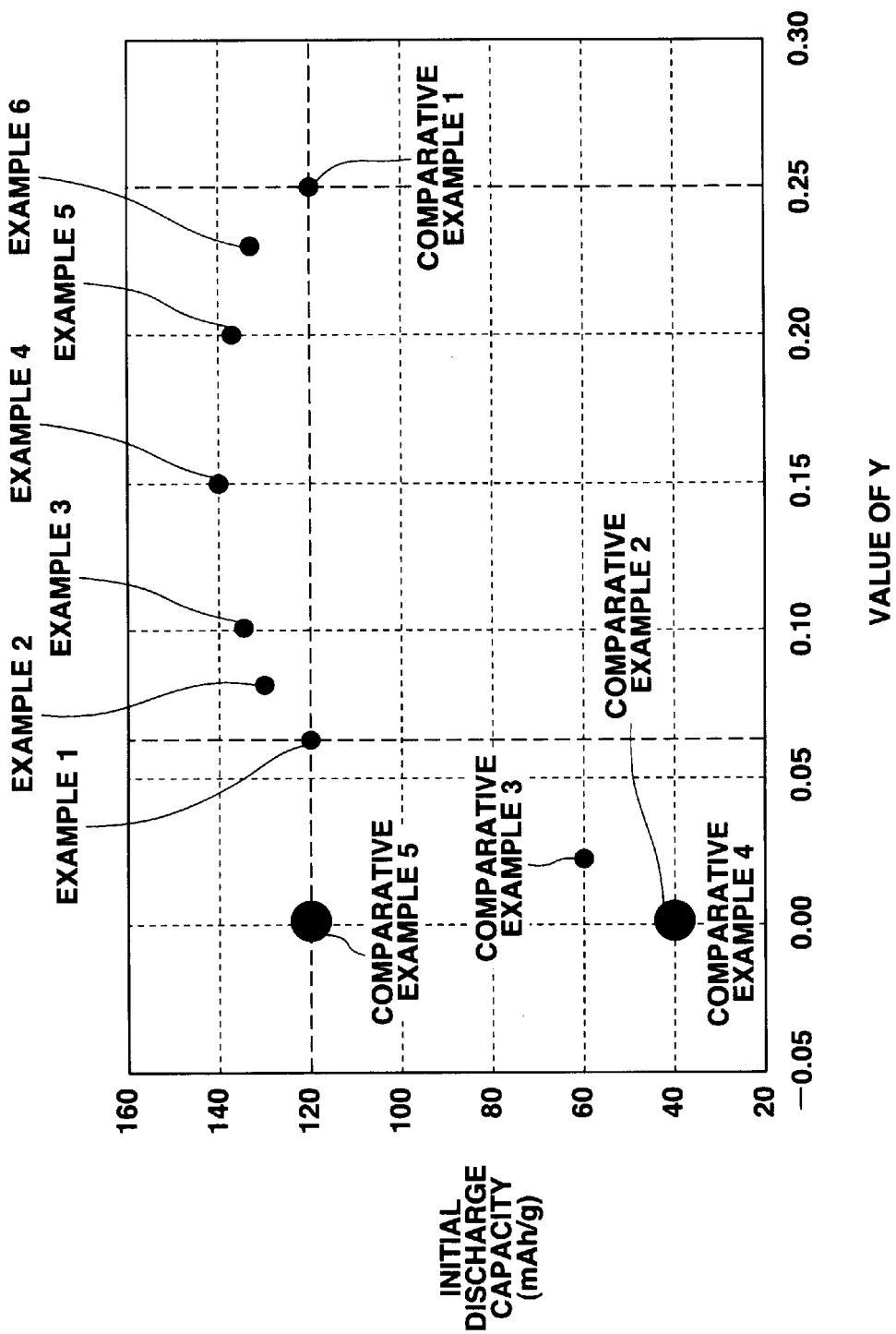
FIG. 4 is a graph showing the relationship between the value of y and the discharge capacity of the battery according to each of examples and comparative examples.

FIG. 4 shows the relationship between the value of y of $LiMn_{1-y}Al_yO_2$ serving as the positive-electrode active material of each of the batteries according to Examples 1 to 6 and Comparative Examples 1 to 5 and the discharge capacity of the same.

As can be understood from FIG. 4, the batteries according to Examples 1 to 6 and each having the structure that the value of y satisfied the range $0.06 \leq y < 0.25$ resulted in high capacities higher than 120 mAh/g. On the other hand, the batteries according to Comparative Examples 3 to 5 each having the structure that the value of y is smaller than 0.06 and the battery according to Comparative Example 1 having the structure that y is 0.25 or larger resulted in insufficient capacities.

Therefore, a fact was confirmed that use of $LiMn_{1-y}Al_yO_2$ having y which satisfied that $0.06 \leq y < 0.25$ enabled a large capacity to be obtained. Although the capacity was limited to that realized when the current density was a high density of 500 $\mu m/cm^2$, a similar effect was obtained when the current density was higher than the foregoing density.

Each of the positive-electrode active materials according to Examples 1 to 6 and Comparative Examples 1 to 5 was formed into a disc-shape having a diameter of 15 mm and a thickness of 1 mm. Then, a DC 4-terminal method was employed to measure the specific resistance of each positive-electrode active material. Results were shown in Table 1.

TABLE 1

| | Value of y | Specific Resistance ($\Omega$cm) |
|---|---|---|
| Example 1 | 0.06 | $2.17 \times 10^5$ |
| Example 2 | 0.08 | $4.88 \times 10^5$ |
| Example 3 | 0.10 | $2.12 \times 10^6$ |
| Example 4 | 0.15 | $6.65 \times 10^6$ |
| Example 5 | 0.20 | $9.19 \times 10^6$ |
| Example 6 | 0.23 | $2.13 \times 10^7$ |
| Comparative Example 1 | 0.25 | $4.10 \times 10^7$ |
| Comparative Example 2 | 0 | $7.32 \times 10^4$ |
| Comparative Example 3 | 0.02 | $1.77 \times 10^5$ |
| Comparative Example 4 | 0 | $1.05 \times 10^6$ |
| Coinparative Example 5 | 0 | $6.66 \times 10^7$ |

As can be understood from Table 1, the specific resistance of each positive-electrode active material was raised as the value of y was enlarged, that is, the ratio of Al, which was electrochemically unstable was raised. When the y was made to satisfy the range y<0.25, the specific resistance of the positive-electrode active material was reduced to a degree at which an adverse influence was not exerted on the performance of the battery.

Figure 5:
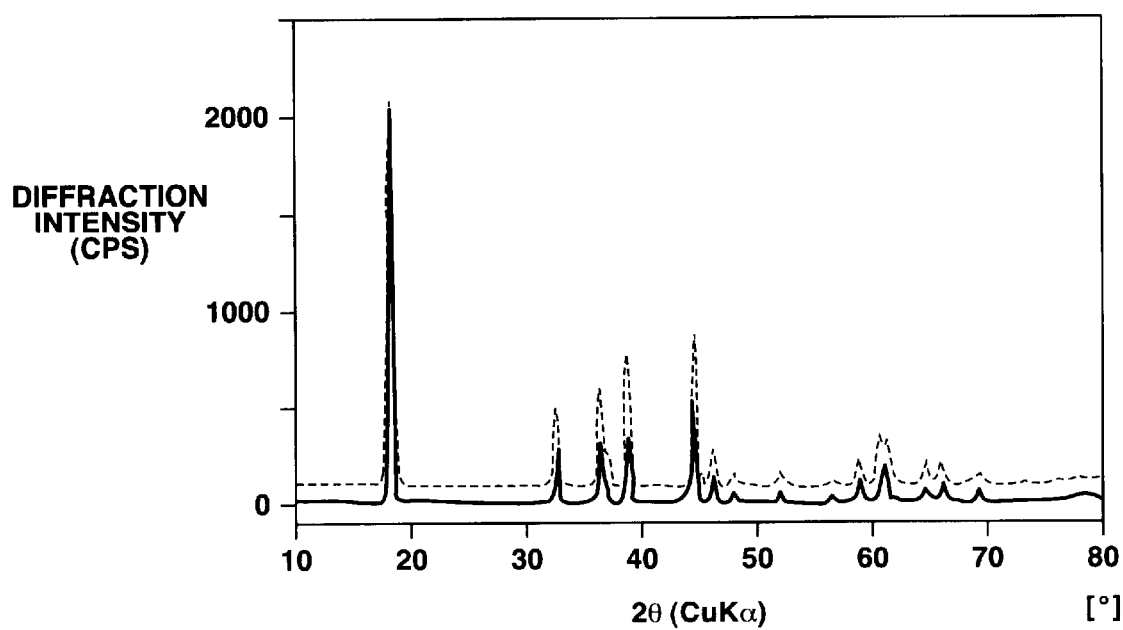
FIG. 5 is a diagram showing the X-ray diffraction pattern of $LiMn_{0.94}Al_{0.06}O_2$ employed as the positive-electrode active material in Example 1.

An X-ray diffraction pattern of $LiMn_{0.94}Al_{0.06}O_2$ serving as the positive-electrode active material according to Example 1 was shown in FIG. 5. Referring to FIG. 5, the X-ray diffraction simulation pattern of crystal having the structure expressed by the spatial group C2/m was indicated with a dashed line.

As can be understood from FIG. 5, the X-ray diffraction pattern of $LiMno_{0.94}Al_{0.06}O_2$ substantially coincided with the X-ray diffraction simulation pattern of C2/m. Thus, a fact was confirmed that $LiMn_{o.94}Al_{0.06}O_2$, had the crystalline structure expressed by space group C2/m.

In the present invention, the compound expressed by $LiMn_{1-y}Al_yO_2$ such that $0.06 \leq y < 0.25$ is satisfied is employed as the positive-electrode active material. Thus, the thermal stability of the crystalline structure can be improved in the charging step. According to the present invention, the non-aqueous electrolyte battery can be realized with which the spinel transition of the positive-electrode active material during the charging step can be prevented and which enables the discharge capacity to be enlarged.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A non-aqueous electrolyte battery comprising:

a positive electrode containing a positive-electrode active material;

a negative electrode containing a negative-electrode active material to which lithium can be doped/dedoped; and a non-aqueous electrolyte disposed between said positive electrode and said negative electrode and containing non-aqueous solvent and an electrolyte, wherein a material expressed by general formula $LiMn_{1-y}Al_yO_2$, where y has a value $0.06 \leq y < 0.25$, is contained as said positive-electrode active material, said positive-electrode active material is obtained from $\gamma$-$MnO_2$, $Li_2CO_3$ and $Al(OH)_3$ and has a crystalline structure expressed by space group C2/m; and wherein said negative electrode active material is any one of lithium, a lithium alloy, a conductive polymer containing lithium doped thereto and an interlayer compound.

2. A non-aqueous electrolyte battery according to claim 1, wherein said electrolyte is at least one material selected from a group consisting of $LiClO_4$, $LiAsF_6$, $LiPF_6$, $LiBF_4$, $LiB(C_6H_5)_4$, $CH_3SO_3Li$, $CF_3SO_3Li$, LiCl and LiBr.

3. A non-aqueous electrolyte battery according to claim 1, wherein said non-aqueous solvent is at least one material selected from a group consisting of polypropylene carbonate, ethylene carbonate, dimethyl carbonate, diethyl carbonate, 1,2-dimethoxyethane, 1,2-diethoxyethane, $\gamma$-butylolactone, tetrahydrofuran, 2-methyltetrahydrofuran, 1,3-dioxolane, 4-methyl-1,3-dioxolane, diethylether, sulfolane, methylsulfolane, acetonitrile, propionitrile, anisole, acetic ester, butyric ester and propionate.

* * * * *